(12) United States Patent
Patterson et al.

(10) Patent No.: US 9,003,709 B2
(45) Date of Patent: Apr. 14, 2015

(54) RETENTION CLIP FOR OUTER BELT WEATHERSTRIP

(75) Inventors: Matthew C. Patterson, Warren, MI (US); Carla P. Giovanardi, Sterling Heights, MI (US); James R. Roll, Ann Arbor, MI (US); Alcino Oliveira, Maple (CA); Kenneth G. Besedich, Rochester Hills, MI (US); Michael E. Williamson, Shelby Township, MI (US); Faisal Sultan, Macomb, MI (US); Alain Pelchat, Woodbridge (CA)

(73) Assignee: GM Global Technology Operations LLC, Detroit, MI (US)

( * ) Notice: Subject to any disclaimer, the term of this patent is extended or adjusted under 35 U.S.C. 154(b) by 297 days.

(21) Appl. No.: 13/449,873

(22) Filed: Apr. 18, 2012

(65) Prior Publication Data

US 2013/0277516 A1    Oct. 24, 2013

(51) Int. Cl.
*B60J 1/16* (2006.01)
*B60J 10/00* (2006.01)
*B60J 10/04* (2006.01)

(52) U.S. Cl.
CPC .............. *B60J 10/008* (2013.01); *B60J 10/041* (2013.01)

(58) Field of Classification Search
USPC .................. 49/493.1, 492.1, 495.1, 377, 374; 52/204.597, 204.591; 296/146.16, 296/146.2
See application file for complete search history.

(56) References Cited

U.S. PATENT DOCUMENTS

| | | | | | |
|---|---|---|---|---|---|
| 800,937 | A | * | 10/1905 | Parkes | 24/316 |
| 4,696,128 | A | * | 9/1987 | Fukuhara | 49/492.1 |
| 4,949,507 | A | * | 8/1990 | Vaughan | 49/482.1 |
| 5,199,760 | A | * | 4/1993 | Vering | 296/146.16 |
| 5,267,415 | A | * | 12/1993 | Vaughan | 49/377 |
| 5,363,537 | A | * | 11/1994 | Schneider et al. | 24/289 |
| 5,463,831 | A | * | 11/1995 | Shinagawa et al. | 49/377 |
| 5,493,815 | A | * | 2/1996 | Belser et al. | 49/490.1 |
| 5,740,640 | A | * | 4/1998 | Yasuda | 52/204.597 |
| 6,128,859 | A | * | 10/2000 | Vance | 49/377 |
| 6,282,840 | B1 | * | 9/2001 | Vance | 49/377 |
| 6,681,526 | B2 | * | 1/2004 | Mueller et al. | 49/440 |
| 6,742,304 | B1 | * | 6/2004 | Mueller et al. | 49/377 |
| 7,171,785 | B1 | * | 2/2007 | Kelly et al. | 49/377 |
| 8,789,313 | B2 | * | 7/2014 | Roll et al. | 49/377 |
| 2014/0183901 | A1 | * | 7/2014 | Jun et al. | 296/146.2 |

* cited by examiner

*Primary Examiner* — Jerry Redman
(74) *Attorney, Agent, or Firm* — Quinn Law Group, PLLC

(57) ABSTRACT

A retention clip for attaching an outer belt weatherstrip to a flange includes a backing plate and an anti-rotation feature attached thereto. The anti-rotation feature biases against the flange to draw the backing plate against the flange to remove lash from between the flange and the backing plate in a lateral direction relative to a first primary axis of the retention clip. An axial biasing member biases against the top edge of the flange to remove lash from between a lower edge of the flange and a latch of the retention clip in an axial direction along the first primary axis. A spacing element engages an interior surface of the outer belt weatherstrip in abutting engagement to resist movement of the outer belt weatherstrip relative to the retention clip along the first primary axis. A release mechanism allows the retention clip to disengage from the flange.

14 Claims, 4 Drawing Sheets

RETENTION CLIP FOR OUTER BELT WEATHERSTRIP

TECHNICAL FIELD

The invention generally relates to a retention clip for attaching an outer belt weatherstrip to a door panel of a vehicle.

BACKGROUND

Vehicular door panels are formed to define a flange that extends around a periphery of a window opening. A plurality of retention clips are attached to an outer belt weatherstrip, and attach the outer belt weatherstrip to the door panel. Accordingly, the retention clips secure the outer belt weather strip relative to the door panel. The retention clips engage both the flange of the door panel and the outer belt weatherstrip in a snap fit interlocking engagement. The retention clips should be designed to prevent the outer belt weatherstrip from rocking back and forth on the flange or presenting a spongy or loose feeling.

SUMMARY

A panel assembly for a vehicle is provided. The panel assembly includes a substrate formed to define a flange. The flange includes a bump bulging outward toward an exterior side of the substrate, and a lower edge spaced from the bump along a first primary axis. The lower edge of the flange is disposed on an interior side of the substrate. A retention clip is attached to the flange of the substrate. The retention clip is configured for attaching an outer belt weatherstrip to the substrate. The retention clip includes a backing plate having a first end and a second end disposed opposite the first end along the first primary axis. A latch is coupled to the backing plate adjacent the second end of the backing plate. The latch is configured for engaging the lower edge of the flange in interlocking engagement to prevent movement along the first primary axis of the retention clip relative to the flange. An anti-rotation feature is coupled to the backing plate adjacent the first end of the backing plate. The anti-rotation feature is laterally spaced from the backing plate to define a receiving channel between the anti-rotation feature and the backing plate. The flange is disposed within the receiving channel with the bump disposed in abutting engagement with the anti-rotation feature. The anti-rotation feature is configured to bias against the bump to draw the backing plate against the flange to remove lash from between the flange and the backing plate in a lateral direction relative to the first primary axis.

A retention clip for attaching an outer belt weatherstrip to a flange of a substrate is also provided. The retention clip includes a backing plate having a first end and a second end, with the second end disposed opposite the first end along a first primary axis. A latch is coupled to the backing plate. The latch is configured for engaging a lower edge of the flange in interlocking engagement to prevent movement along the first primary axis of the retention clip relative to the flange. An anti-rotation feature is coupled to the backing plate adjacent the first end of the backing plate. The anti-rotation feature is laterally spaced from the backing plate to define a receiving channel between the anti-rotation feature and the backing plate. The anti-rotation feature is configured to bias against the flange to draw the backing plate against the flange to remove lash from between the flange and the backing plate in a lateral direction relative to the first primary axis. An axial biasing member is coupled to the backing plate adjacent the first end of the backing plate. The axial biasing member extends into the receiving channel for abutting engagement with a top edge of the flange. The axial biasing member is configured to bias against the top edge of the flange to remove lash from between the lower edge of the flange and the latch in an axial direction along the first primary axis.

Accordingly, the retention clip is designed to remove lash in both the axial direction along the first primary axis and the lateral direction perpendicular to the first primary axis to prevent relative movement between the retention clip and the flange of the substrate, e.g., a door panel, thereby reducing the relative movement of the outer belt weatherstrip relative to the substrate.

The above features and advantages and other features and advantages of the present invention are readily apparent from the following detailed description of the best modes for carrying out the invention when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the invention, as defined by the appended claims.

Figure 1:
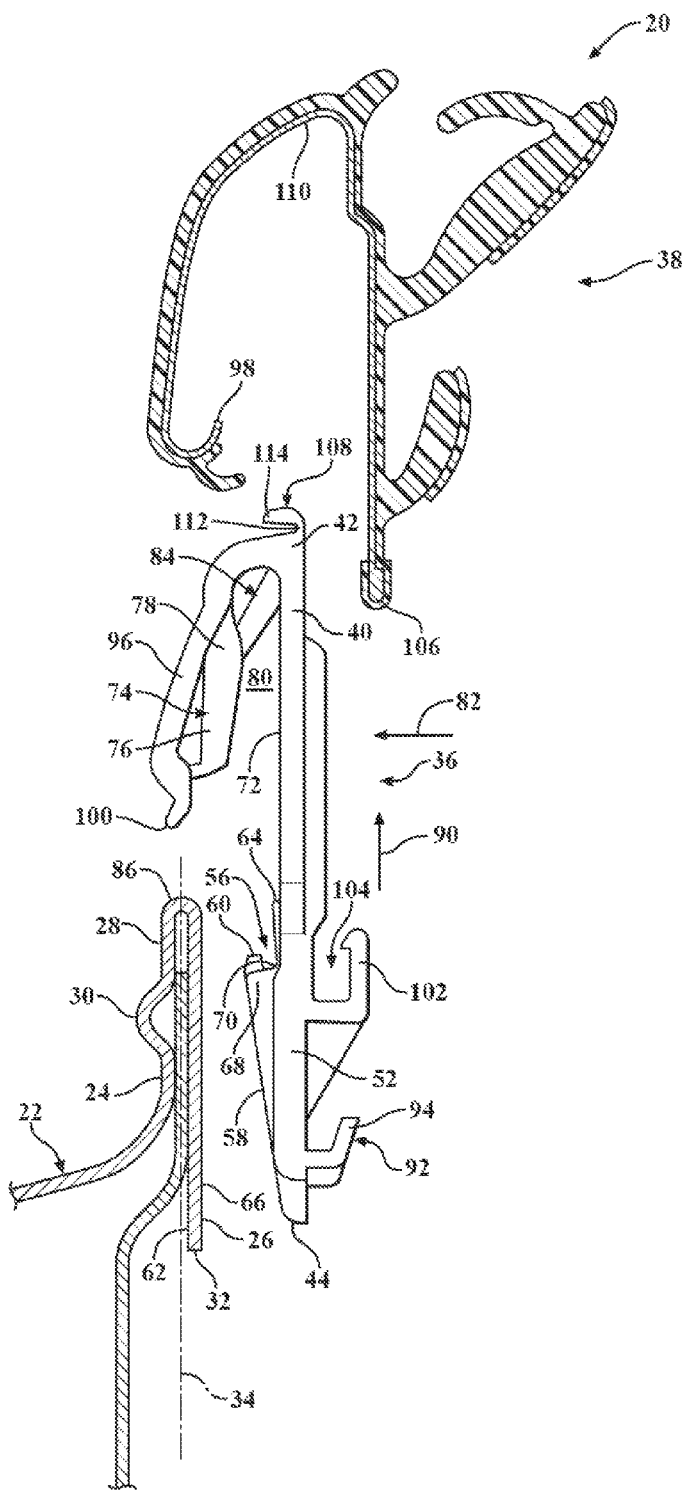
FIG. 1 is a schematic exploded cross sectional view of a panel assembly, cut perpendicular to a second primary axis, showing a retention clip for attaching an outer belt weather strip to a flange of a substrate.
Figure 3:
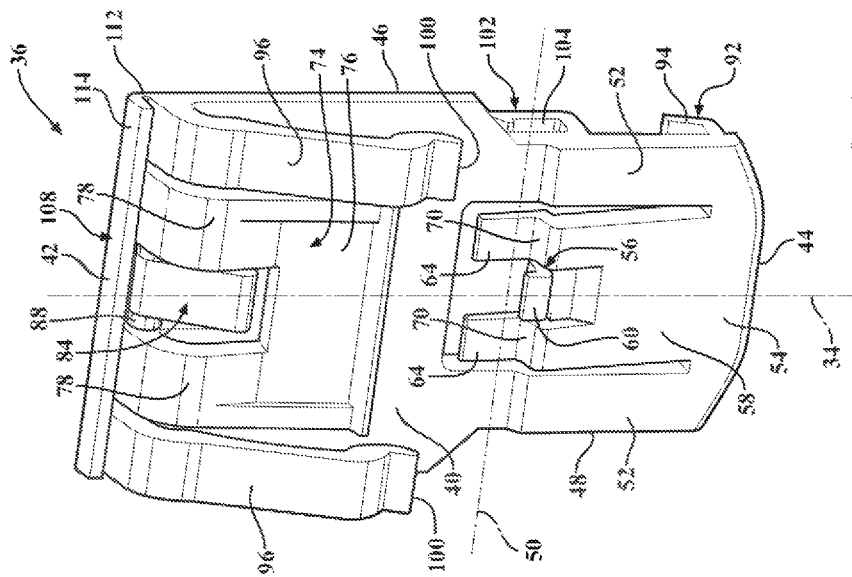
FIG. 3 is a schematic perspective view of the retention clip.
Figure 2:
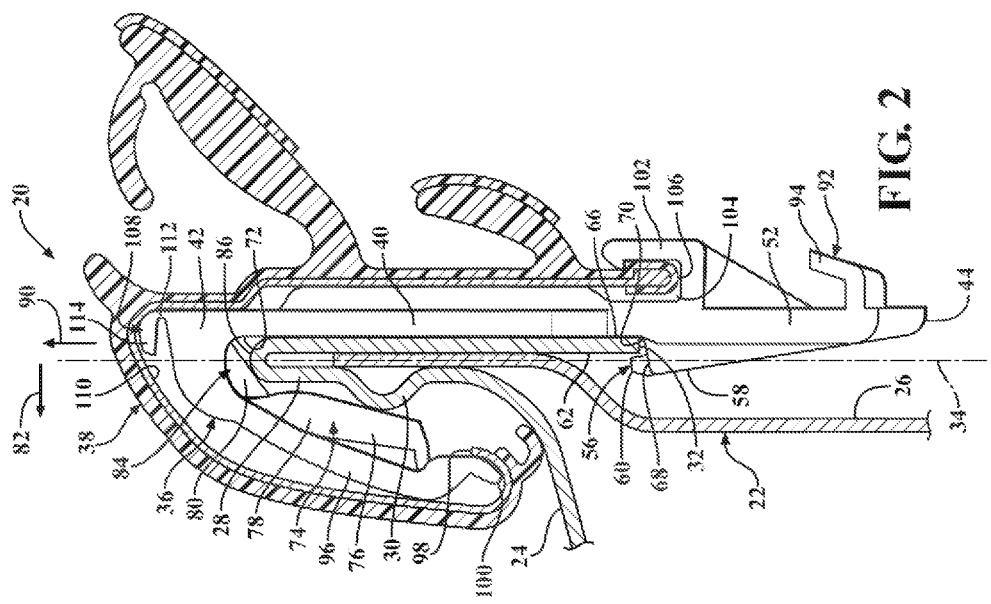
FIG. 2 is a schematic cross sectional view of the panel assembly, cut perpendicular to the second primary axis, showing the retention clip attached to the flange of the substrate, and the outer belt weatherstrip attached to the retention clip.

Referring to the Figures, wherein like numerals indicate like parts throughout the several views, a panel assembly for a vehicle is generally shown at 20. The panel assembly 20 may include but is not limited to a door panel assembly. The panel assembly 20 includes a substrate 22. Referring to FIGS. 1 and 2, the substrate 22 is formed to define a desired shape, and defines an exterior side 24 and an interior side 26. The substrate 22 is formed to define a flange 28 that extends around or is disposed adjacent a periphery of an opening, such as but not limited to a window opening. For example, the substrate 22 may be formed by bending an edge of the substrate 22 over against itself. The flange 28 is further formed to include a bump 30 and a lower edge 32. The bump 30 is disposed facing the exterior side 24 of the substrate 22, and the lower edge 32 is disposed on the interior side 26 of the substrate 22. The bump 30 bulges outward toward the exterior side 24 of the substrate 22, and away from a first primary axis 34. The lower edge 32 is spaced from the bump 30 along the first primary axis 34. As shown in FIGS. 1 and 2, the lower edge 32 is vertically spaced below the bump 30. However, it should be appreciated that the relative positioning of the lower edge 32 relative to the bump 30 is dependent upon the orientation of the flange 28.

Figure 6:
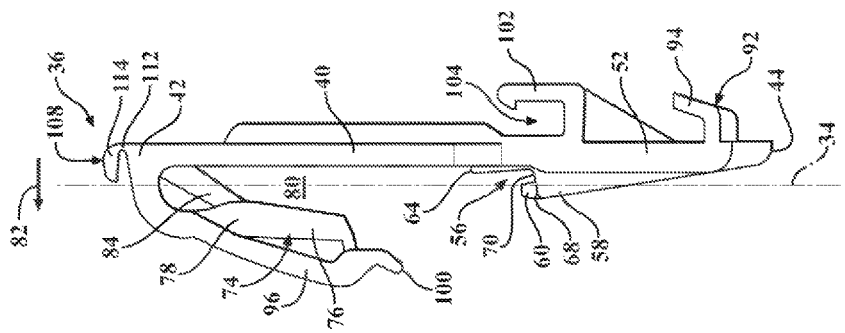
FIG. 6 is a schematic plan view of a side of the retention clip.
Figure 5:
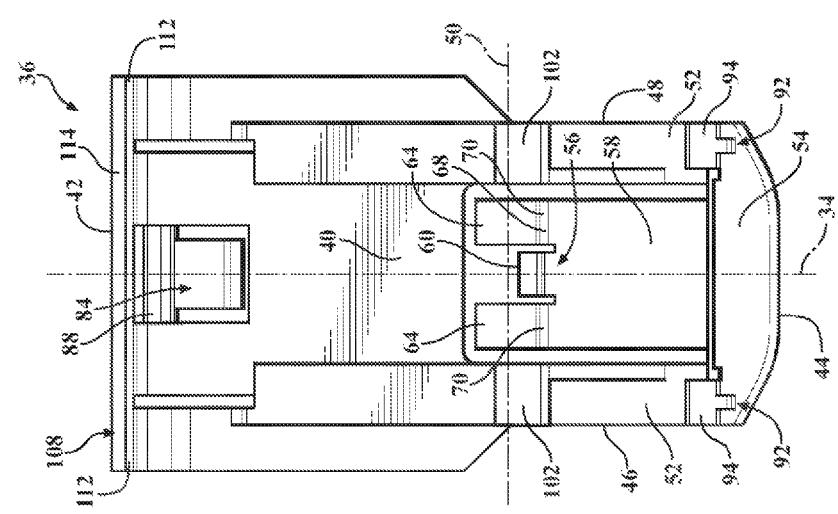
FIG. 5 is a schematic plan view of an interior side of the retention clip.
Figure 4:
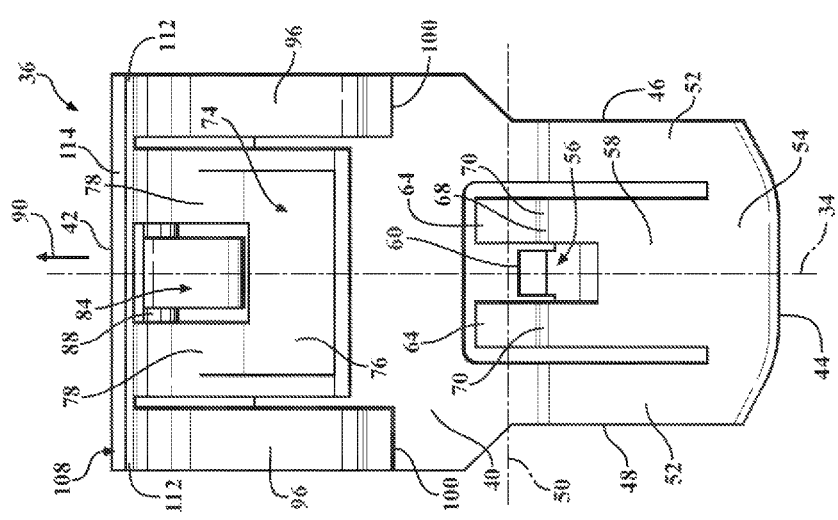
FIG. 4 is a schematic plan view of an exterior side of the retention clip.

A retention clip 36 attaches an outer belt weatherstrip 38 to the substrate 22. The shape, size and/or configuration of the outer belt weatherstrip 38 are not pertinent to the description of the preferred embodiment, and so is not described in detail herein. The retention clip 36 is shown attached to the flange 28 of the substrate 22 in FIGS. 2, 7 and 8. Referring to FIGS. 4 through 6, the retention clip 36 includes a backing plate 40 having a length extending between a first end 42 and a second end 44 along the first primary axis 34. The second end 44 is disposed opposite the first end 42 along the first primary axis 34. Referring to FIGS. 4 and 5, the backing plate 40 includes a width extending between a first edge 46 and a second edge 48 along a second primary axis 50. The backing plate 40 defines a substantially planar structure to which various other features of the retention clip 36 extend from and/or are attached to. The backing plate 40 includes a pair of tabs 52 extending along the first primary axis 34. The pair of tabs 52 is spaced from each other along the second primary axis 50. The backing plate 40 further includes a crossbar portion 54 that extends between the pair of tabs 52 and is disposed adjacent the second end 44 of the backing plate 40.

Figure 8:
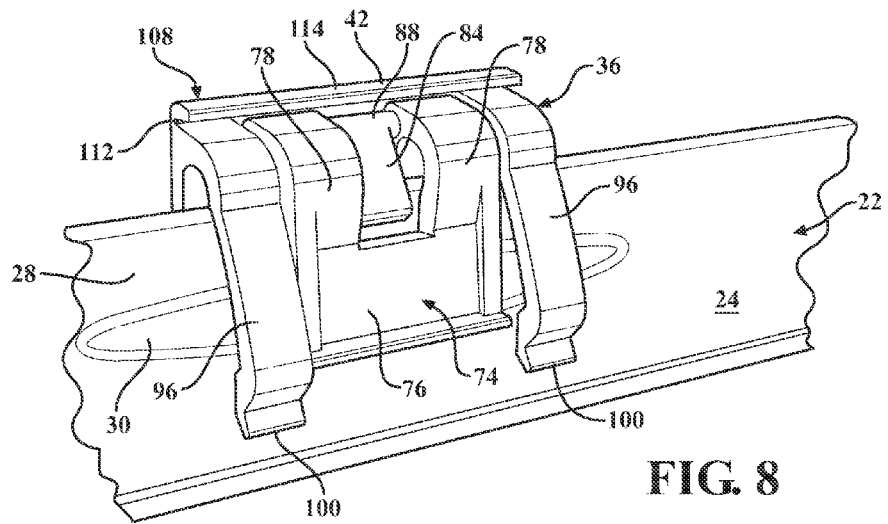
FIG. 8 is a schematic perspective view of the interior side of the retention clip attached to the substrate.

Referring to FIGS. 3 through 6, the retention clip 36 includes a latch 56. The latch 56 is coupled to the backing plate 40 adjacent or near the second end 44 of the backing plate 40. As shown in FIGS. 2 and 8, the latch 56 engages the lower edge 32 of the flange 28 in interlocking engagement to prevent movement along the first primary axis 34 of the retention clip 36 relative to the flange 28. The latch 56 includes a latch plate 58 that extends from the crossbar portion 54 toward the first end 42 of the backing plate 40. The latch 56 includes a first lip 60 engaging a first side 62 of the substrate 22 adjacent the lower edge 32 of the flange 28, and a pair of second lips 64 engaging a second or opposing side 66 of the substrate 22 adjacent the lower edge 32 of the flange 28. The first lip 60 and the pair of second lips 64 extend axially along the first primary axis 34 from a distal end 68 of the latch plate 58 toward the first end 42 of the backing plate 40. The lower edge 32 of the flange 28 is disposed between the first lip 60 and the pair of second lips 64, and is supported on a shelf 70 extending between the first lip 60 and the pair of second lips 64. The latch plate 58 extends inward of and is angled relative to the pair of tabs 52 of the backing plate 40 such that the shelf 70 is spaced from an interior surface 72 of the backing plate 40 to receive the lower edge 32 of the flange 28.

Figure 7:
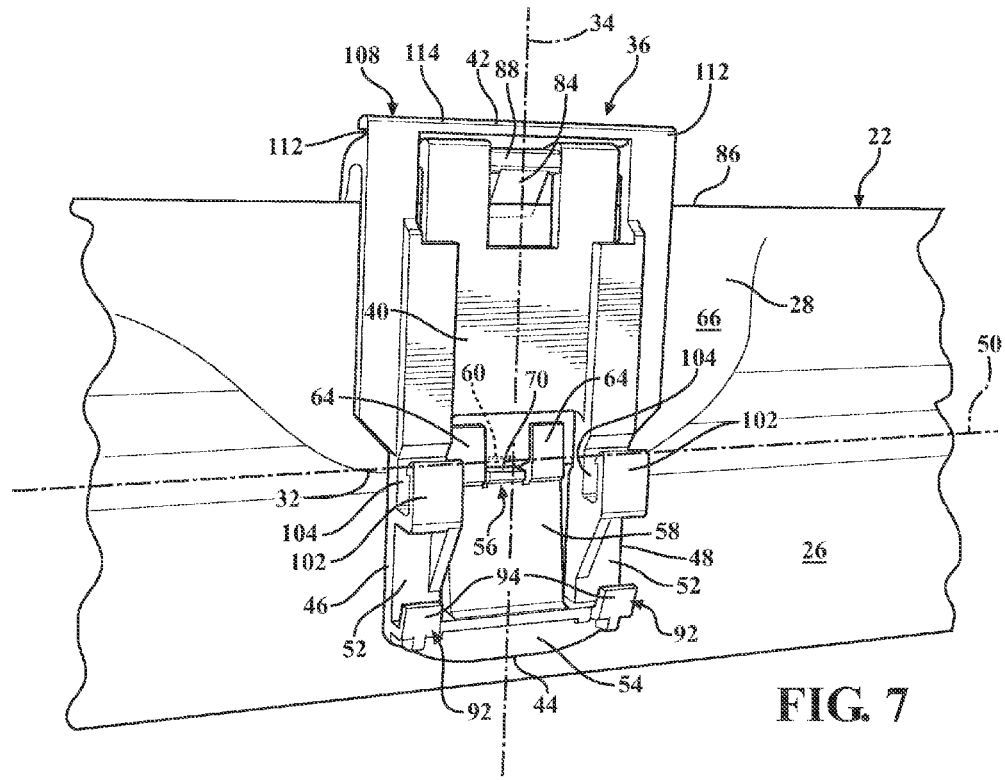
FIG. 7 is a schematic perspective view of the exterior side of the retention clip attached to the substrate.

An anti-rotation feature 74 is coupled to the backing plate 40 adjacent the first end 42 of the backing plate 40. The anti-rotation feature 74 includes a planar portion 76 and a pair of connecting portions 78. The planar portion 76 is laterally spaced from the backing plate 40. The pair of connecting portions 78 attaches the planar portion 76 to the first end 42 of the backing plate 40. The pair of connecting portions 78 is disposed at opposite ends of the planar portion 76 along the second primary axis 50, and cooperates to define a gap therebetween that extends along the second primary axis 50. The pair of connecting portions 78 forms a spring that biases the planar portion 76 toward the backing plate 40. The backing plate 40, the pair of connecting portions 78 and the planar portion 76 cooperate to define a receiving channel 80 therebetween. As best shown in FIGS. 2 and 7, the flange 28 is disposed within the receiving channel 80 with the bump 30 disposed in abutting engagement with the planar portion 76 of the anti-rotation feature 74. The planar portion 76 of the anti-rotation feature 74 biases against the bump 30 to draw the backing plate 40 against the flange 28, i.e., the flange 28 is compressed between the planar portion 76 of the anti-rotation feature 74 and the backing plate 40. The anti-rotation feature 74 biases the flange 28 against the backing plate 40 to remove lash from between the flange 28 and the backing plate 40 in a lateral direction, generally indicated by direction arrow 82 shown in FIG. 2, relative to the first primary axis 34. As used herein, the term "lash" is defined as a gap or spacing between two components. By removing the lash from between the backing plate 40 and the flange 28, the anti-rotation feature 74 prevents the retention clip 36 from moving or rotating relative to the flange 28, which thereby prevents or limits relative movement of the outer belt weatherstrip 38 relative to the substrate 22, which improves customer satisfaction.

Referring to FIGS. 3 through 6, the retention clip 36 further includes an axial biasing member 84. The axial biasing member 84 is coupled to the backing plate 40 adjacent the first end 42 of the backing plate 40. As shown in FIGS. 2 and 7, the axial biasing member 84 extends into the receiving channel 80 into abutting engagement with a top edge 86 of the flange 28. The axial biasing member 84 extends from the first end 42 of the backing plate 40 toward the planar portion 76 of the anti-rotation feature 74. The axial biasing member 84 is disposed within the gap defined between the pair of connecting portions 78 of the anti-rotation feature 74. The retention clip 36 includes a biasing connection 88 that attaches the axial biasing member 84 to the backing plate 40 at the first end 42 of the backing plate 40. The biasing connection 88 resists movement or rotation of the axial biasing member 84 upward toward the first end 42 of the backing plate 40. The axial biasing member 84 biases against the top edge 86 of the flange 28 to draw the shelf 70 into tight engagement with the lower edge 32 of the flange 28 to remove lash from between the lower edge 32 of the flange 28 and the shelf 70 of the latch 56 in an axial direction, generally indicated by direction arrow 90, along the first primary axis 34. By removing the lash between the flange 28 and the retention clip 36 along the first primary axis 34, the axial biasing member 84 reduces the movement of the retention clip 36 relative to the flange 28 along the first primary axis 34, thereby reducing movement of the outer belt weather strip relative to the substrate 22, which improves customer satisfaction.

Referring to FIGS. 3 through 6, the retention clip 36 further includes a release mechanism 92. The release mechanism 92 is coupled to the backing plate 40 adjacent the second end 44 of the backing plate 40. The release mechanism 92 is configured to move the backing plate 40 along the first primary axis 34 to release the latch 56 from interlocking engagement with the lower edge 32 and allow removal of the retention clip 36 from the flange 28. The release mechanism 92 is axially spaced from the shelf 70 along the first primary axis 34, and is disposed nearer the second end 44 of the backing plate 40 than the shelf 70. As shown, the release mechanism 92 includes a pair of hooks 94 extending laterally away from the backing plate 40, farther inward toward the interior side 26 of the substrate 22. The pair of hooks 94 may be engaged with a tool, thereby allowing an axial force to be applied to the backing plate 40 along the first primary axis 34, which will move or rotate the axial biasing member 84 toward the first end 42 of the backing plate 40 and move the lower edge 32 of the flange 28 away from the shelf 70, thereby disengaging contact between the first lip 60 and the flange 28 to allow the retention clip 36 to then be rotated out of position and removed.

A pair of connecting arms 96 is coupled to the backing plate 40 adjacent the first end 42 of the backing plate 40. The connecting arms 96 are laterally spaced from the backing plate 40 and are disposed on the exterior side 24 of the substrate 22. The pair of connecting arms 96 is spaced from each other along the second primary axis 50. The axial biasing member 84 and the anti-rotation feature 74 are both disposed between the pair of connecting arms 96. As shown in FIG. 2, the pair of connecting arms 96 engages a first longitudinal edge 98 of the outer belt weatherstrip 38 in interlocking engagement to secure the outer belt weatherstrip 38 to the retention clip 36. The outer belt weather strip is attached to the pair of connecting arms 96 at a distal end 100 of the connecting arms 96. The planar portion 76 of the anti-rotation feature 74 is disposed nearer the backing plate 40 then the distal ends 100 of the pair of connecting arms 96 so that the planar portion 76 does not interfere with the outer belt weatherstrip 38.

Referring to FIGS. 3 through 6, a pair of connecting supports 102 is coupled to the backing plate 40, and extends laterally away from the backing plate 40 on the interior side 26 of the substrate 22 in a direction opposite the pair of connecting arms 96. The pair of connecting supports 102 defines a support channel 104 that extends along the second primary axis 50. As shown in FIG. 2, the pair of connecting supports 102 engages a second longitudinal edge 106 of the outer belt weatherstrip 38 in interlocking engagement to secure the outer belt weatherstrip 38 relative to the retention clip 36. The second longitudinal edge 106 of the outer belt weatherstrip 38 is supported by the connecting supports 102 within the support channel 104.

Referring to FIGS. 3 through 6, the retention clip 36 further includes a spacing element 108 that is coupled to the backing plate 40 adjacent the first end 42 of the backing plate 40. The spacing element 108 extends axially away from the backing plate 40 along the first primary axis 34. As shown in FIG. 2, the spacing element 108 engages an interior surface 110 of the outer belt weatherstrip 38 adjacent the first end 42 of the backing plate 40 in abutting engagement, and compensates for variation in the shape of the outer belt weatherstrip 38. The spacing element 108 includes a pair of leg portions 112, with each leg portion extending from the first end 42 of the backing plate 40 adjacent one of the pair of connecting arms 96. The leg portions 112 extend away from the backing plate 40 along the first primary axis 34. The spacing element 108 further includes a cross portion 114 that extends between the pair of leg portions 112 along the second primary axis 50. The center of the cross portion 114 extends away from the backing plate 40 along the first primary axis 34. The center portion extends farther away from the backing plate 40 than the leg portions 112 to form a spring that biases the clip in the direction of the primary axis 34 to prevent the clip from rotating or translating within the outer belt section.

The retention clip 36, including all the features and components described above as part thereof, including but not limited to: the backing plate 40, the anti-rotation feature 74, the axial biasing member 84, the latch 56, the release mechanism 92, the spacing element 108, the connecting arms 96 and the connecting supports 102, may all be integrally formed together from a resilient polymer material. However, it should be appreciated that one or more of the components of the retention clip 36 may be independently formed and attached to thereto. Furthermore, it should be appreciated that the retention clip 36 may alternatively be manufactured from a material other than a resilient polymer, such as a metal.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A panel assembly for a vehicle, the panel assembly comprising:
    a substrate formed to define a flange having a bump bulging outward toward an exterior side of the substrate, and a lower edge spaced from the bump along a first primary axis and disposed on an interior side of the substrate;
    a retention clip attached to the flange of the substrate and configured for attaching an outer belt weatherstrip to the substrate, the retention clip including:
        a backing plate having a first end and a second end disposed opposite the first end along the first primary axis;
        a latch coupled to the backing plate adjacent the second end of the backing plate, and configured for engaging the lower edge of the flange in interlocking engagement to prevent movement along the first primary axis of the retention clip relative to the flange; and
        an anti-rotation feature coupled to the backing plate adjacent the first end of the backing plate and laterally spaced from the backing plate to define a receiving channel between the anti-rotation feature and the backing plate;
    wherein the flange is disposed within the receiving channel with the bump disposed in abutting engagement with the anti-rotation feature; and
    wherein the anti-rotation feature is configured to bias against the bump to draw the backing plate against the flange.

2. A panel assembly as set forth in claim 1 wherein the anti-rotation feature includes a planar portion spaced from the backing plate and a pair of connecting portions attaching the planar portion to the first end of the backing plate and disposed at opposite ends of the planar portion along a second primary axis.

3. A panel assembly as set forth in claim 2 wherein the pair of connecting portions form a spring biasing the planar portion toward the backing plate.

4. A panel assembly as set forth in claim 1 wherein the retention clip further includes an axial biasing member coupled to the backing plate adjacent the first end of the backing plate and extending into the receiving channel into abutting engagement with a top edge of the flange, wherein the axial biasing member is configured to bias against the top edge of the flange.

5. A panel assembly as set forth in claim 4 wherein the retention clip includes a biasing connection attaching the axial biasing member to the backing plate at the first end of the backing plate.

6. A panel assembly as set forth in claim 1 wherein the retention clip further includes a release mechanism coupled to the backing plate adjacent the second end of the backing plate and configured to draw the backing plate along the first primary axis to release the latch from interlocking engagement with the lower edge to allow removal of the retention clip from the flange.

7. A panel assembly as set forth in claim 6 wherein the latch includes a first lip engaging a first side of the substrate adjacent the lower edge of the flange, and a pair of second lips engaging a second side of the substrate adjacent the lower edge of the flange, wherein the lower edge of the flange is disposed between the first lip and the pair of second lips and is supported on a shelf extending between the first lip and the pair of second lips.

8. A panel assembly as set forth in claim 7 wherein the release mechanism is axially spaced from the shelf along the first primary axis.

9. A panel assembly as set forth in claim 8 wherein the backing plate includes a pair of tabs extending along the first primary axis and spaced from each other along the second primary axis, and further includes a crossbar portion extending between the pair of tabs adjacent the second end of the backing plate.

10. A panel assembly as set forth in claim 9 wherein the latch includes a latch plate extending from the crossbar portion toward the first end of the backing plate, wherein the latch plate extends inward of and is angled relative to the pair of tabs such that the shelf is spaced from an interior surface of the backing plate.

11. A panel assembly as set forth in claim 1 wherein the retention clip further includes a spacing element coupled to the backing plate adjacent the first end of the backing plate and extending axially away from the backing plate along the first primary axis, wherein the spacing element is configured for engaging an interior surface of the outer belt weatherstrip in abutting engagement.

12. A panel assembly as set forth in claim 1 wherein the retention clip further includes a pair of connecting arms coupled to the backing plate adjacent the first end of the backing plate and laterally spaced from the backing plate on the exterior side of the substrate, wherein the pair of connecting arms are configured to engage a first longitudinal edge of the outer belt weatherstrip in interlocking engagement.

13. A panel assembly as set forth in claim 12 wherein the planar portion of the anti-rotation feature is disposed nearer the backing plate then a distal end of the pair of connecting arms.

14. A panel assembly as set forth in claim 12 wherein the retention clip further includes a pair of connecting supports coupled to the backing plate and extending laterally away from the backing plate in a direction opposite the pair of connecting arms on the interior side of the substrate, wherein the pair of connecting supports define a support channel configured to engage a second longitudinal edge of the outer belt weatherstrip in interlocking engagement.

* * * * *